Patented June 8, 1948

UNITED STATES PATENT OFFICE 2,443,167

COPOLYMERS PREPARED FROM ALLYLIDENE DIHALIDES

Louis M. Minsk and William O. Kenyon, Rochester, N. Y., assignors to Eastman Kodak Company, Rochester, N. Y., a corporation of New Jersey No Drawing. Application June 15, 1944,
Serial No. 540,550

3 Claims. (Cl. 260—86)

This invention relates to copolymers prepared by copolymerizing allylidene dihalides with other compounds containing an olefinic linkage, particularly vinyl acetate.

Heretofore the use of chlorides of unsaturated compounds for preparing polymers has been suggested. In most previous cases the halogen has been directly connected with a double bonded carbon so that upon polymerization the chlorine is attached directly to the polymer chain and is limited accordingly.

One object of our invention is to provide a method of preparing polymers containing chlorine groups in the side chains thereof. Another object of our invention is to provide a method of preparing polymers using unsaturated chlorinated hydrocarbons the chlorine atoms of which are readily susceptible to reaction. Other objects of our invention will appear herein.

We have found that compounds having the formula:

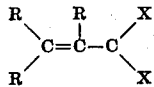

where X are halogen atoms and R are hydrogen, alkyl or aryl groups will readily copolymerize with other olefinic compounds under mild polymerizing conditions to form polymerized products having new and interesting properties.

In its broader aspects our invention comprises copolymerization reactions generally of unsaturated compounds with allylidene dihalides, either substituted or unsubstituted. It is preferred however, to employ as the second unsaturated compound a vinyl compound such as vinyl acetate.

The representative example of a compound which may be employed herein is allylidene dichloride. This compound is conveniently prepared by reacting acrolein with phosphorous pentachloride. A suitable method for preparing allylidene dichloride is as follows: 300 grams of finely powdered phosphorous pentachloride was placed in a vessel and cooled with an ice and salt bath. One hundred grams of acrolein was added thereto portionwise and with constant mechanical stirring. A vigorous reaction ensued and the reaction mixture passed through the slurry stage and finally to a clear solution. When all the acrolein was in, the mass was stirred for 30 minutes at room temperature. The solution was then distilled through a long column, a fraction boiling up to 100° C. being collected. This fraction was washed with ice water to remove phosphorus oxychloride and dried over calcium chloride for 24 hours. It was then filtered to remove the calcium chloride and again distilled as above, this time collecting the fraction boiling between 83 and 92° C. This fraction was redistilled with refluxing, the product boiling between 83 and 83.8° C. was collected, the major portion boiling between 83.5 and 83.8° C. The chlorine content of the resulting product was 63.55%.

The substituted allylidene dichlorides may also be employed in accordance with our invention. These compounds may be prepared by reacting with phosphorus pentachloride upon an unsaturated aldehyde such as methacrolein, ethacrolein, crotonaldehyde, cinnamaldehyde, α-ethyl-β-propyl acrolein or α-halogeno acrolein. If desired the dibromide may be prepared by using phosphorus pentabromide and the resulting product may be employed for the formation of copolymers in accordance with our invention.

The allylidene dihalide is copolymerized with another compound containing an olefinic linkage, some representative examples of which are vinyl acetate, methyl acrylate, methyl methacrylate, styrene and the like, these being the olefinic compounds which would be regarded as the most useful from a practical standpoint.

Although copolymerization in the mass has been found to be of value as a method of preparing final products in accordance with our invention, other commonly recognized polymerization methods may be employed such as polymerization in the dispersed phase (emulsion polymerization) or by a bead method. As the polymerization occurs under mild conditions, one of the usual polymerization catalysts such as benzoyl peroxide, acetyl peroxide, hydrogen peroxide, sodium perborate or other of the oxygen type catalysts may be employed to promote the reaction.

The products of our invention are polymeric materials having chlorine substituents in the side chains. These substituents lend themselves readily to further reaction. For instance, if the polymer is subjected to a hydrolysis, the halogen hydrolyzes off, and aldehyde group is formed. For instance, the copolymer of vinyl acetate and allylidene chloride may be hydrolyzed and both chloride and acetyl substituents will be replaced by hydroxyl and aldehyde substituents.

The following examples illustrate our invention:

Example 1

16 parts of vinyl acetate, 4 parts of allylidene dichloride and 0.04 part of benzoyl peroxide were sealed into a glass tube and heated at 50° C. in a constant temperature water bath. After 26 days the contents of the tube had reached the consistency of a heavy syrup. This was diluted with 50 parts of acetone and poured into boiling, distilled water. Steam was then passed through the water suspension of the polymer for 3 hours to remove traces of monomer and solvent, and the polymer was dried for 20 hours at 55° C. and under a vacuum of 20 inches of mercury. Some discoloration occurred during the drying, and the polymer, colorless when first isolated, became a clear brown. The resulting product was found to have a chlorine content of 13.7% which corresponds to a allylidene chloride content in the copolymer of 21.6%.

Example 2

16 parts of methyl methacrylate, 4 parts of allylidene chloride and 0.04 gram of benzoyl peroxide were sealed into a glass tube and heated in a water bath at 50° C.. In 41 hours the contents of the tube changed to a clear, solid polymer. This polymer was broken from the tube and dispersed on a shaker in 300 parts of acetone. The resin was precipitated from this dope by pouring it into an excess of absolute alcohol. The precipitate was subjected to three extractions with fresh alcohol, allowing at least 1 hour of soaking with each change. The product was dried in a vacuum desiccator over calcium chloride under a constant vacuum. The resulting polymer was found to have a chlorine content of 1.96% corresponding to 3.07% of allylidene dichloride in the polymer.

Example 3

16 parts of styrene, 4 parts of allylidene dichloride and 0.04 part of benzoyl peroxide were sealed into a glass tube and heated in a constant temperature bath maintained at 50° C. After 12 days the contents of the tube no longer showed flow on inversion. The resin was broken from the tube and was dissolved in 200 parts of 1,4-dioxane. The dope was poured into an excess of absolute alcohol to precipitate the resin. The precipitate was extracted with alcohol to remove monomer and solvent, and the polymer was dried in a vacuum desiccator over calcium chloride under a constant vacuum. The resulting polymer was found to have a chlorine content of 2.14% indicating 3.35% of allylidene dichloride in the polymer.

For analysis, all the samples were subjected to extra drying at 55° C. under a vacuum of 20 inches of mercury.

In accordance with our invention, it is desirable that at least 2% of the mixture to be polymerized be an allylidene dihalide to impart the properties which characterize its copolymer to the resulting product. Where amounts of allylidene dichloride on the order of 2% have been used in forming mixtures with other olefinic compounds, which mixtures are then co-polymerized the characteristics of the resulting products are altered. Allylidene dihalide may be present in any amount in the mixture from 2% up to 70%, the sole criterion of the percentage to use being the degree to which the product is to be characterized by chlorine substituent side chains. The products described may be used for molding materials, in lacquers or overcoatings. If these products are hydrolyzed, different characteristics are obtained depending on the composition of the polymer and the degree of hydrolysis.

We claim:

1. A copolymer of a mixture of vinyl acetate and a compound comprising 2–70% of the mixture having the formula:

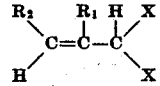

X being a substituent selected from the group consisting of chlorine and bromine and $R_1$ and $R_2$ being substituents selected from the group consisting of hydrogen, alkyl and aryl.

2. A copolymer of a mixture of 2–70% of allylidene dichloride and vinyl acetate.

3. A process for preparing a copolymer which comprises heating a mixture of 2–70% of allylidene dichloride and vinyl acetate mixed with a peroxide polymerization catalyst.

LOUIS M. MINSK.
WILLIAM O. KENYON.

REFERENCES CITED

The following references are of record in the file of this patent:

UNITED STATES PATENTS

| Number | Name | Date |
|---|---|---|
| 2,066,330 | Carothers et al. | Jan. 5, 1937 |
| 2,278,415 | Arnold | Apr. 7, 1942 |
| 2,356,871 | Moffett et al. | Aug. 29, 1944 |
| 2,426,913 | Adelson et al. | Sept. 2, 1947 |

OTHER REFERENCES

Beilstein, Handbook der organischen Chemie, vol. 1, page 199, 4th ed., 1918.